May 19, 1953 G. L. C. EARLE 2,638,891
COMBINATION SPACE AND WATER HEATER AND INCINERATOR UNIT
Filed Dec. 12, 1947 2 Sheets-Sheet 1
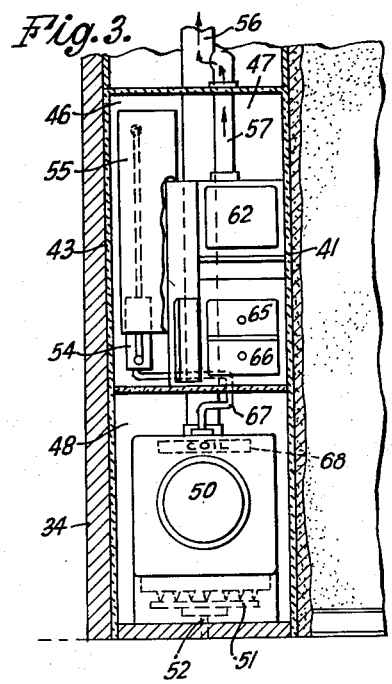
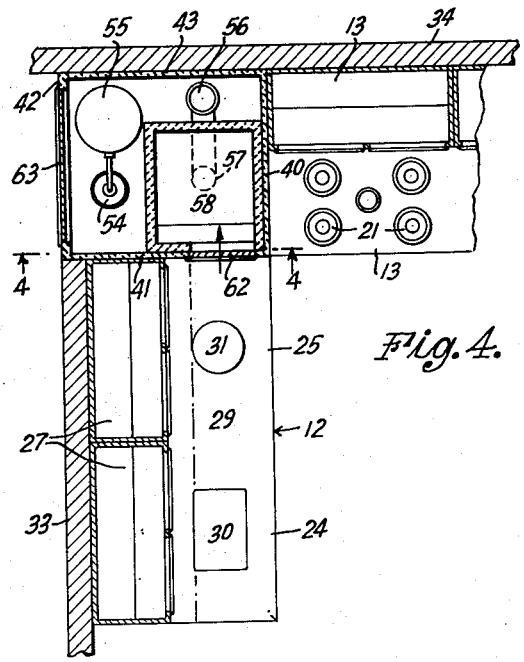
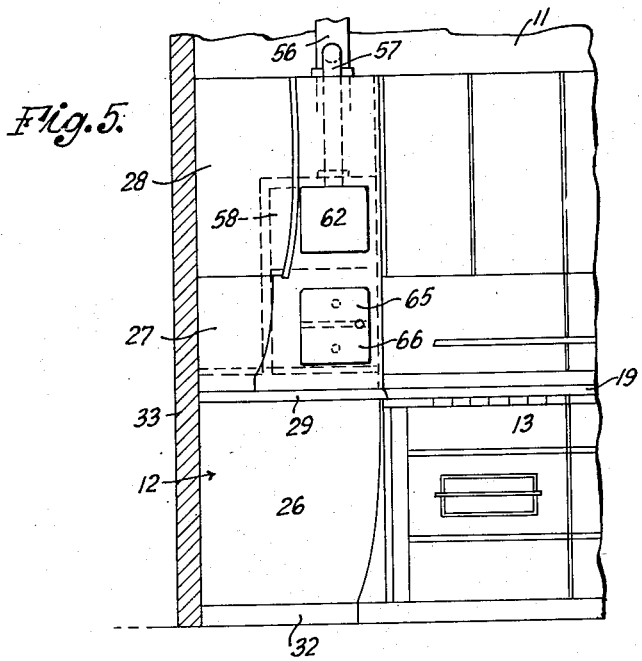
INVENTOR.
GUYON L. C. EARLE
BY Hugh S. Wartz
ATTORNEY

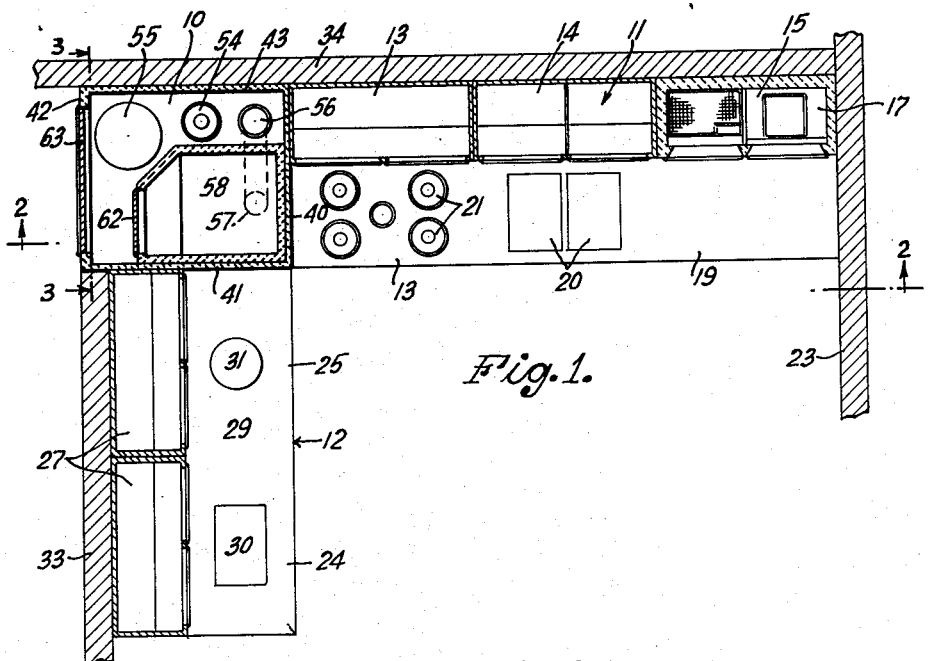
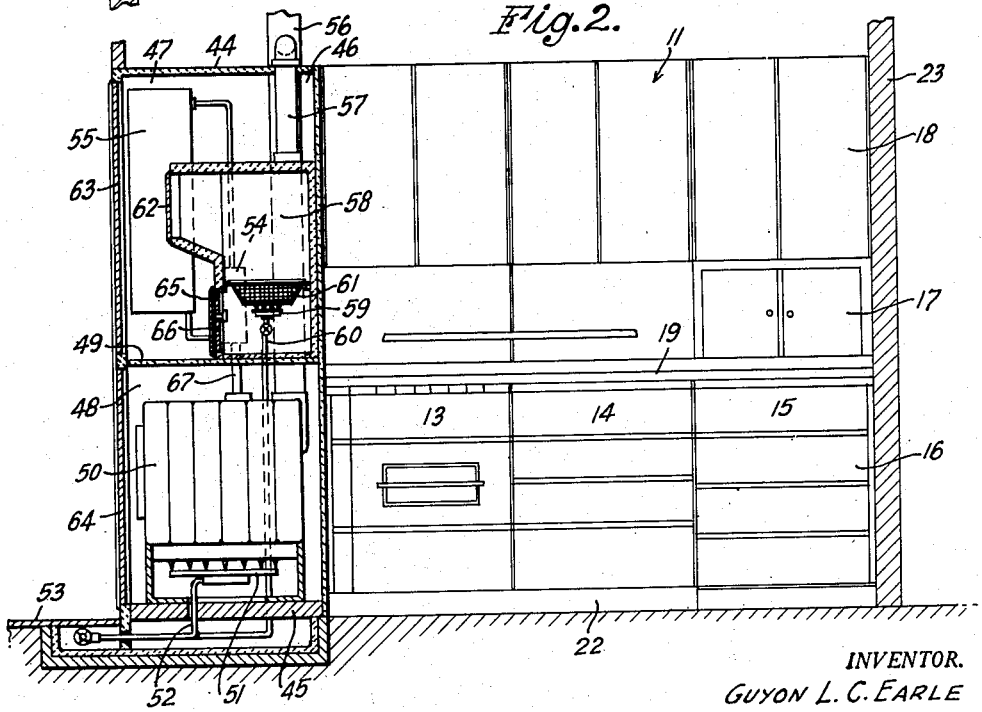

Patented May 19, 1953

2,638,891

UNITED STATES PATENT OFFICE 2,638,891

COMBINATION SPACE AND WATER HEATER AND INCINERATOR UNIT

Guyon L. C. Earle, Forest Hills, N. Y.

Application December 12, 1947, Serial No. 791,255

2 Claims. (Cl. 126—224)

This invention relates to heating devices and more specifically to a combination unit for space heating and incineration purposes.

Modern housing is so expensive that there is a ready demand for cellarless houses in order to save the cost of labor and material required in making a basement. Since the heating plant is normally in the basement, its omission requires that the house heater be located elsewhere. Oil, gas or coal furnaces have accordingly been placed in utility rooms which are often near the kitchens of the houses. The present invention relates to a compact house heater (which may be gas, oil or electric) and incinerator unit which while suitable for use in a utility room is also well adapted for inclusion in a combination kitchen-utility unit located in the kitchen.

It is an object of this invention to reduce the space required for house heaters and incinerators.

It is another object of this invention to simplify the plumbing and other connections to and from a house heater and an incinerator.

It is still another object of this invention to combine within a single "package" a house heater and an incinerator.

It is a further object of this invention to provide a combination house heater-incinerator unit one or more of the walls of which serve as side members for other elements of a kitchen or utility unit.

Other objects of the invention and various features thereof will be apparent from the following description and the claims.

The various objects are attained by providing, in accordance with an exemplary embodiment of the invention, a single package combination house heater and incinerator unit which is particularly adapted to be the corner member of a turn-corner kitchen-utility unit although the house heater and incinerator unit may be located elsewhere. It comprises a box-like container having four insulated vertical walls and insulated top and bottom members which container serves as an enclosure for a house heater (including a space heater and a hot water heater) and a separate incinerator. The space heater comprises the customary hollow metal heat passages in contact with air, water or steam, heated by gas, oil or electricity. These heating elements are located in the lower portion of the enclosure. A heating coil for hot water may be placed in the house heater or be a conventional "side arm" heater in the enclosure. Also in this upper portion is a hot water tank and an incinerator for garbage and trash. Preferably, piping from the heating coil in the house heater to the hot water tank passes through the incinerator to dry garbage placed therein. The incinerator access and clean out doors can be reached from a hallway or room adjacent the kitchen or, in an alternative arrangement, from the kitchen. The incinerator and space heater are preferably connected to the same flue system or, if this is not desired, to separate flue systems. If gas or oil are utilized for heating, much piping can be saved because of the close spacing between the incinerator and space heaters and if electricity is used for this purpose, a saving in wire and perhaps other material can be realized. Since all the heating elements have a common insulated enclosure, insulation can be saved. Because of its shape, it can be used in a corner and its wall used as the side or end members of kitchen and utility unit sections saving space which otherwise cannot readily be used for other purposes.

The invention will be more readily understood by referring to the following description taken in connection with the accompanying drawings forming a part thereof, in which:

Fig. 1 is a plan view, with portions in cross-section, of a turn-corner combination kitchen-utility unit embodying a single-package house heater and incinerator unit in accordance with this invention;

Fig. 2 is an elevation view, with portions in cross-section along the lines 2—2 in Fig. 1, of the arrangement of Fig. 1 above the lines 2—2;

Fig. 3 is a side elevation view, with portions in cross-section along the lines 3—3 in Fig. 1, taken from the left and looking in the direction of the arrows;

Fig. 4 is a partial plan view, with portions in cross-section, of an arrangement like that of Fig. 1 except that the positioning of the elements in the single-package unit has been modified and the doors to the incinerator are differently placed; and Fig. 5 is a front elevation view of the arrangement of Fig. 4.

Referring more specifically to the drawings, Figs. 1, 2 and 3 show, by way of example for purposes of illustration, a single-package house heater and incinerator unit 10 in accordance with the invention. This unit 10 preferably but not necessarily forms an element of a kitchen assemblage comprising a kitchen unit 11 preferably of the set-back or L-type disclosed for example in Patent 2,349,541, issued May 23, 1944, to Guyon L. C. Earle, and a utility unit 12 also preferably of the set-back type. The units 10, 11 and 12 collectively form a turn-corner kitchen utility unit which is very efficient and saves much space in the home.

The kitchen unit 11 comprises a set-back stove section 13, a set-back sink section 14, and a set-back refrigerator section 15. Each of these sections has a lower portion 16, an intermediate portion 17 and an upper portion 18. Above the lower portion and in front of the intermediate portion is a table-top member 19 having cut-out or dropped portions for the sink 20 and the stove burners 21. The unit rests on a recessed base 22 and preferably is placed adjacent a wall or end member 23 so that no dirt-catching cracks or gaps are present. It is also preferably placed next to or near a back wall 34. Since the detailed construction of a suitable L-shaped kitchen unit and the advantages thereof are set forth in the Earle patent identified above, no further description thereof need be given here.

The utility unit 12 comprises a low-freeze section 24 and a washing machine section 25. Like the kitchen unit 11, the utility unit 12 has (see Fig. 5) a lower portion 26, an intermediate portion 27 and an upper portion 28. The table-top member 29 has breaks therein for the low-freeze unit access door or lid 30 and the access or soap door 31 for the clothes washing machine 25. Utility unit sections of the type disclosed above are described in greater detail in an application of Guyon L. C. Earle, Serial No. 629,680, filed Nov. 19, 1945, which application is now abandoned. The utility unit is mounted on a recessed base 32 and is positioned adjacent a wall 33. The wall 33 has a break therein so that the heater-incinerator unit 10 can be serviced or utilized from the side of the wall remote from the kitchen, such as in a hallway or from the exterior of the building, for example.

The space between the kitchen unit 11 and the utility unit 12 which is occupied by the heater-incinerator unit 10 is, because of its nature, not very suitable for cabinet space because, as shown in Fig. 5, only limited access can be had to it from the kitchen and that only from a limited area adjacent the upper and intermediate portions of the kitchen and utility units. The unit 10 thus only uses space in the kitchen which is not fully satisfactory for cabinet space. Moreover, it will be appreciated from the drawings that two of its vertical walls 40 and 41 serve as end members for the kitchen and utility units 11 and 12, respectively, and thus prevent crevices which pick up dirt.

The heater-incinerator unit 10 comprises an enclosure member 46 having four vertical walls 40, 41, 42 and 43 which are heavily insulated and a top member 44 and a bottom member 45 which are also insulated. The horizontal cross-section is substantially a square although actually the walls 41 and 43 are slightly wider (by the width of the wall 33) than the walls 40 and 42. The enclosure member 46 has an upper portion 47 and a lower portion 48 which are preferably separated by a partition member 49.

A space heater or air-conditioning unit 50 is placed in the lower portion 48 of the unit 10 and this may be of any well-known type. It may, for example, comprise a multiplicity of metal coils through which air, water or steam is circulated or heat passages in contact with these heating elements, the fluid being heated by any suitable means 51 being fed with gaseous or oil fuel by pipes 52 approaching the unit from under the floor 53. Obviously, electric heating means can be used instead of oil or gas. If desired, any well-known type of air conditioning unit—both heating and cooling—can be located in the lower portion 48 instead of merely a space heater, as indicated in Fig. 3 of the drawings. The heater or air conditioning unit 50 is connected in circuit by means of pipe 67 with a hot water heater 54 and a hot water tank 55 which are located in the upper portion 47 of the enclosure member 46. If desired, the member 54 and 55 can be separate from the circuit of the unit 50, the heater 54 being a side arm automatic heater. The member 50 is also connected to a flue member 56 which may be, or not as desired, connected to a flue 57 for the incinerator to be described below. For simplicity in the drawings, the ducts and the cooling apparatus for the air conditioning system have not been shown but these may be of any well-known type.

Also located within the upper portion 47 of the enclosure member 46 is an incinerator 58 which has insulated walls, top and bottom. The walls of the incinerator need not be as heavily insulated as is usually the case because the outer enclosure 46 is insulated. A heating means 59 is supplied with oil or gaseous fuel from the pipe 60. A mesh basket 61 holds the refuse while it is being burned. Access to the incinerator is by the door 62 which is adjacent a door 63 in the wall 42. (A corresponding lower door 64 is also in this wall.) Lower access and clean-out doors 65 and 66 are located in the lower part of the incinerator. If the heater 54 is heated by a coil 68 or immersion type heater in the space heater 50 (see Fig. 3), the pipe 67 is caused, as shown more specifically in Fig. 3, to pass through the incinerator 58, thereby helping to dry the garbage therein.

In the arrangement of Figs. 4 and 5, the access and clean-out doors 62, 65 and 66 are positioned so that they can be opened from the kitchen side. This leads to a somewhat different arrangement of the member 54 and 55 in the upper portion but their connections are similar to those of the arrangement of Figs. 1, 2 and 3.

It will be appreciated that in the arrangement of the present invention a very small floor area is taken up by three complete utility items—space heater, hot water heater and tank, an incinerator—and this floor area is no more than would be taken by a space heater alone. Moreover, if this area is the corner of a turn-corner kitchen utility unit, space which is not suitable for other cabinet purposes is sufficiently utilized.

Various other modifications can be made in the embodiments described without departing from the spirit of the invention, the scope of which is indicated in the claims.

What is claimed is:

1. A single-package house heater and incinerator unit comprising an enclosure member formed by vertical insulated walls, an insulated top and an insulated bottom, said enclosure member having upper and lower portions, a space heater located in said lower portion, a hot water heater element in said space heater, an incinerator and a hot water tank located in said upper portion, and closed piping between said hot water heater element and said hot water tank, said piping passing through said incinerator to dry garbage placed therein.

2. A single-package house heater and incinerator unit comprising an enclosure member formed by vertical insulated walls, an insulated top and an insulated bottom, said enclosure member having upper and lower portions, a space heater located in said lower portion, a hot water heater element in said space heater, an incinerator and a hot water tank located in said upper portion, closed piping between said hot water heater element and said hot water tank, said piping passing through said incinerator to dry garbage placed therein, and a common flue for said space heater and said incinerator above said insulated top.

G. L. C. EARLE.

References Cited in the file of this patent

UNITED STATES PATENTS

| Number | Name | Date |
|---|---|---|
| 391,614 | Hoskin | Oct. 23, 1888 |
| 1,108,184 | Kerner | Apr. 25, 1914 |
| 1,456,022 | Hopkins | May 22, 1923 |
| 2,037,895 | Gugler | Apr. 21, 1936 |
| 2,269,055 | Gower | Jan. 6, 1942 |
| 2,391,544 | Chapman | Dec. 25, 1945 |
| 2,419,319 | Lankton | Apr. 22, 1947 |